United States Patent [19] | [11] Patent Number: 4,977,954
Potier et al. | [45] Date of Patent: Dec. 18, 1990

[54] RAPID ACTION COUPLING SYSTEM FOR A HEAT EXCHANGER FLUID TANK

[75] Inventors: Michel Potier, Rambouillet; Gilles Briet, Gueugnon, both of France

[73] Assignees: Valeo Thermique Moteur, Le Mesnil-Saint-Denis; Hutchinson, Paris, both of France

[21] Appl. No.: 407,954

[22] Filed: Sep. 15, 1989

[30] Foreign Application Priority Data

Sep. 16, 1988 [FR] France ............................. 88 12149

[51] Int. Cl.$^5$ .......................... F28F 9/00; F16L 39/02
[52] U.S. Cl. ..................................... 165/76; 165/176; 165/104.32; 285/137.1; 285/921
[58] Field of Search .................. 165/176, 104.32, 178, 165/76; 285/921, 137.1

[56] References Cited

U.S. PATENT DOCUMENTS 4,520,867 6/1985 Sacca et al. ...................... 165/176
4,765,658 8/1988 Reche ................................. 285/921

FOREIGN PATENT DOCUMENTS 2502291 7/1976 Fed. Rep. of Germany .
1595595 9/1981 United Kingdom .

Primary Examiner—Albert W. Davis, Jr.
Attorney, Agent, or Firm—Dennison, Meserole, Pollack & Scheiner

[57] ABSTRACT

The fluid tank includes two coaxial necks. The inner neck is defined by a longitudinal portion of a partition that also includes at least one transverse portion dividing the fluid tank longitudinally into two chambers for the inlet and outlet of fluid. A rapid coupling device cast en bloc includes two coaxial necks cooperating respectively with the necks of the fluid tank, to couple the chambers to an external circuit.

17 Claims, 4 Drawing Sheets

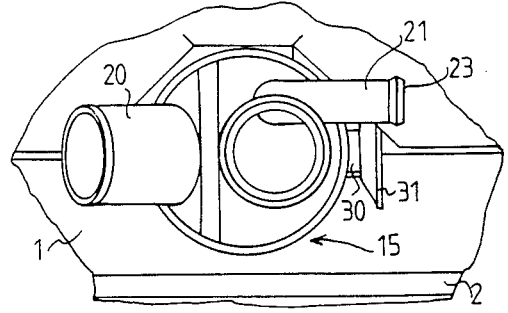
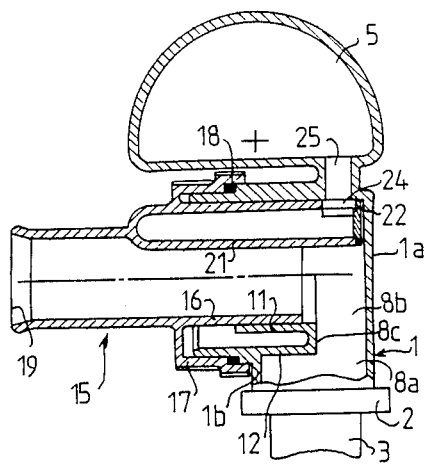
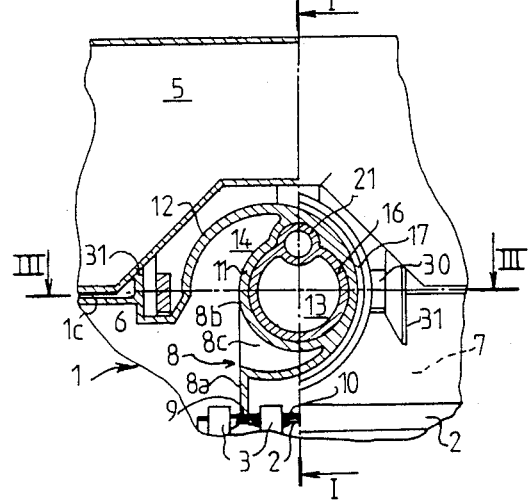
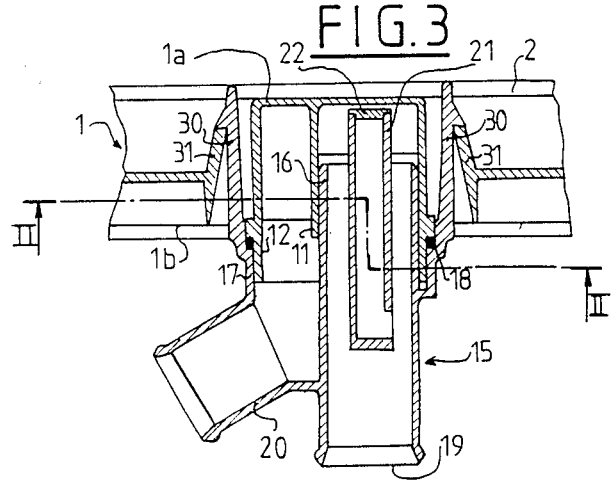

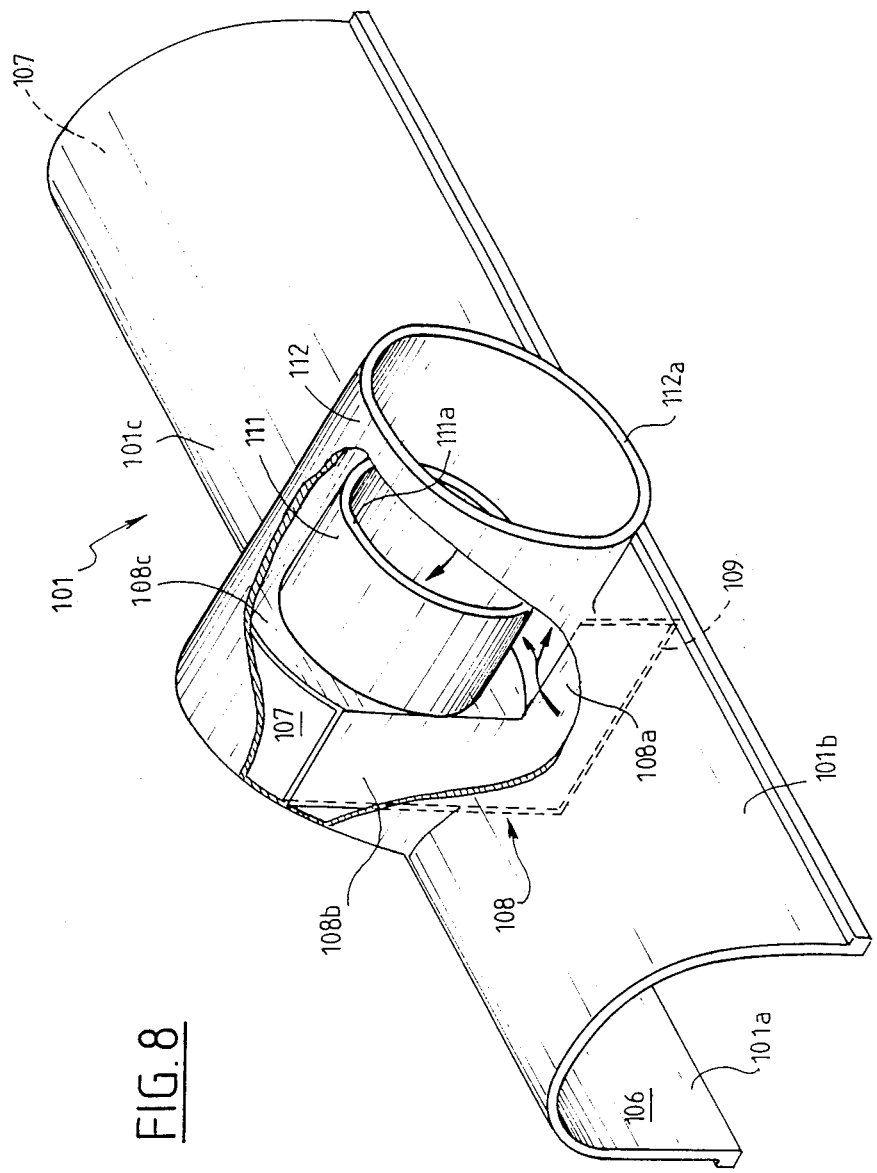

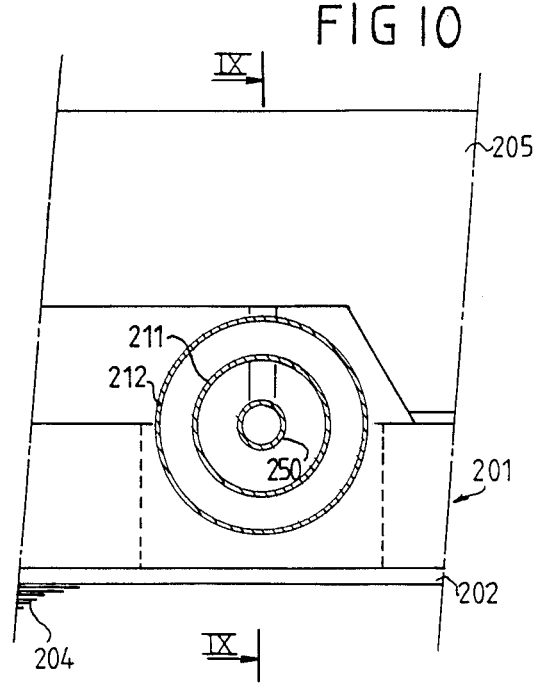
FIG 10
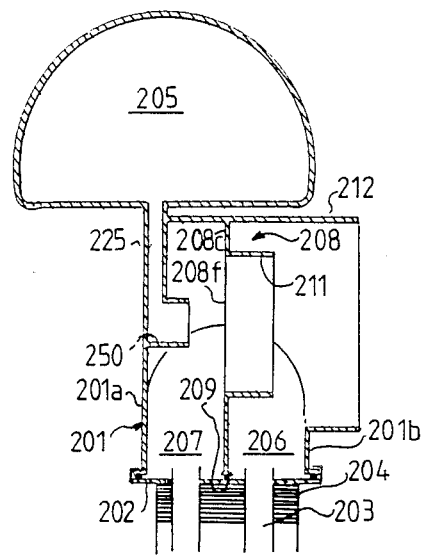
FIG.9
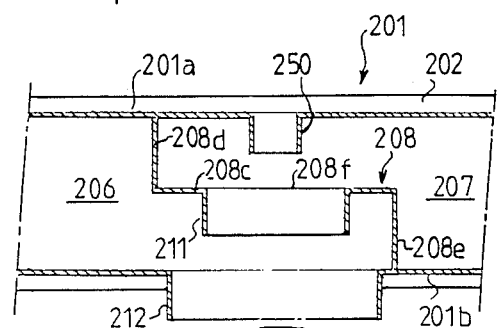
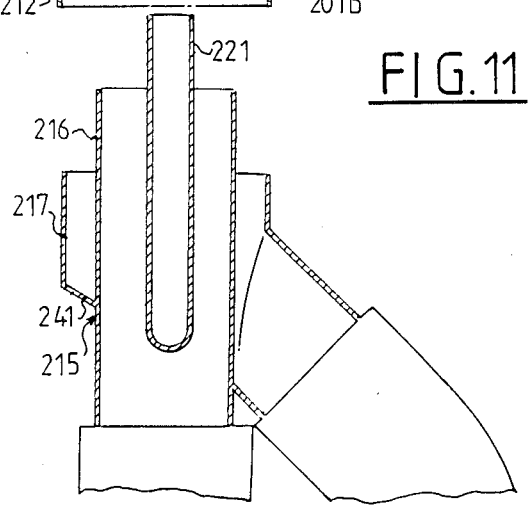
FIG.11

RAPID ACTION COUPLING SYSTEM FOR A HEAT EXCHANGER FLUID TANK

BACKGROUND OF THE INVENTION

The invention relates to a rapid action coupling system for simultaneously coupling a fluid inlet chamber and a fluid outlet chamber, formed in the same heat exchanger fluid tank and separated from one another by a partition, to an external circuit, one free edge of which partition is intended to cooperate in a sealed manner with a collector defining the two chambers. The system includes two necks provided on the fluid tank, that is, one inner and one outer neck substantially surrounding the inner neck, the necks defining two fluid passages, respectively an inner and an outer passage, which communicate respectively with the two chambers. The inner neck is joined directly to a planar portion of the partition extending in the longitudinal direction of the fluid tank. A coupling device, cast en bloc or as one piece, is provided with tubular necks arranged to cooperate with the inner and outer necks of the fluid tank, respectively.

Such a system is described in French Patent Application FR-A No. 2579308, corresponding to U.S. Pat. No. 4,765,658. It is applicable to a heat exchanger, in particular for an automobile, that includes a bank of tubes formed either with U-shaped tubes connecting the two chambers of the fluid tank to one another or with straight tubes divided into two groups, respectively connecting the two chambers to a second fluid tank located opposite the first one. This rapid action coupling replaces conventional systems, which include an inlet coupling piece and an outlet coupling piece protruding in two mutually remote locations of the fluid tank, and onto which flexible or rigid hoses are threaded in separate operations. In the known system, the partition is disposed entirely along the longitudinal direction of the fluid tank, which it consequently divides into laterally disposed chambers. Frequently, though, it is desirable to divide the fluid tank into longitudinally juxtaposed chambers via a partition that extends at least partly transversely.

OBJECT AND SUMMARY OF THE INVENTION

The object of the present invention is to adapt the known system to such an arrangement.

This object is attained according to the invention by joining the planar longitudinal portion of the partition to at least one transverse portion thereof, so as to divide the fluid tank longitudinally.

Further characteristics and advantages of the invention will become more apparent from the ensuing detailed description of some exemplary embodiments, taken in conjunction with the drawings.

BRIEF DESCRIPTION OF THE DRAWINGS

FIG. 1 is a sectional view of a rapid action coupling system according to the invention, showing part of the heat exchanger with which it is associated, the section being taken transversely of the fluid tank along the line I—I of FIG. 2;

FIG. 2 is a sectional view taken along the line II—II of FIG. 3;

FIG. 3 is a sectional view taken along the line III—III of FIG. 2;

FIG. 4 is a fragmentary elevation view of FIG. 2;

FIG. 8 is a fragmentary perspective view, partly cut away, of the fluid tank shown in FIGS. 5 and 6;

FIG. 9 is a fragmentary, schematic view in section, taken along the line IX—IX of FIG. 10, of the heat exchanger in a third exemplary embodiment of the invention;

FIG. 10 is a fragmentary, schematic view of the heat exchanger of FIG. 9; and

FIG. 11 is a fragmentary, schematic view in section, taken along the line XI—XI of FIG. 9, showing the heat exchanger and coupling device ready to be mounted.

DESCRIPTION OF THE PREFERRED EMBODIMENTS

Figure 5:
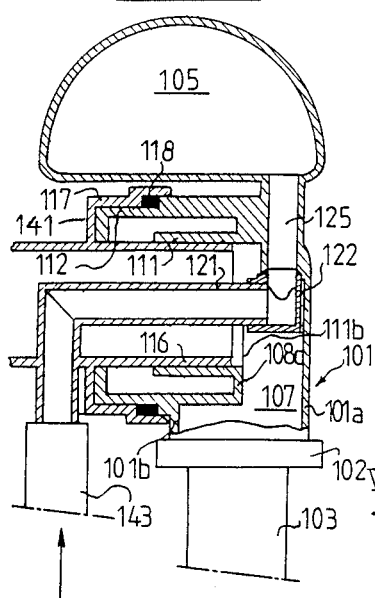
FIG. 5 is a view similar to FIG. 1, taken along the line V—V of FIG. 6, relating to a second exemplary embodiment.

In the ensuing description, the terms upper, lower, front and rear refer to the elements as seen in FIGS. 2, 4, 6 and 10, in which the fluid tank is located above the bank of vertically extending heat exchanger tubes, and the coupling is effected by a movement of the coupling device from front to rear.

FIGS. 1-4 show part of an automobile heat exchanger, including an upper fluid tank 1 associated with a collector 2 through which pass the upper ends of the tubes 3 of a bank comprising vertically oriented tubes each extending over substantially the entire width of the fluid tank 1. The tubes 3 communicate at their lower end with a lower fluid tank (not shown). The fluid tank is divided on the interior into two chambers 6 and 7 by a transversely extending partition 8. The partition 8, molded in a single piece with the fluid tank, has a lower rectilinear edge 9 extending transversely over the entire width of the fluid tank and joining with the rear and front longitudinal walls 1a and 1b of the fluid tank. The edge rests on the collector 2, between two consecutive tubes 3, via a gasket comprising an elastomer sheet 10 that likewise assures a tight seal at the passages of the tubes through it.

The partition 8 includes a portion 8a that is included in a vertical plane transverse to the fluid tank and extending over the entire width of the fluid tank, up to a certain height from the edge 9 where it meets the lower portion of the neck 12, which will be described later herein. Beyond that, a portion 8b located in the same plane begins, extending vertically until it meets the neck 11, also described later herein, and horizontally from the rear wall 1a to the longitudinal vertical plane containing a third portion 8c of the partition, which it joins. The portion 8c extends toward the right in FIG. 2, beginning at the plane of the portions 8a and 8b, between the necks 11 and 12, to which it is joined.

The coupling system according to the invention includes an inner neck 11 and an outer neck 12, formed integrally with the fluid tank and oriented from rear to front. At their free end oriented toward the front, the inside surface of the inner neck 11 and the outer surface of the outer neck 12 have circular cross sections, the first circle being located inside the second. The inner neck 11 on its interior defines an inner fluid passage 13 communicating with the chamber 7, and the two necks between them define a passage 14 that is external of the neck 11 and communicates with the chamber 6. The passage 14 does not completely surround the neck 11;

the two necks are joined together along a generatrix on the right-hand side of FIG. 2. The cross section of the neck 12 is completely circular from its free end as far as the front wall 1b of the fluid tank. Beyond that wall, it is interrupted over part of its circumference, between the upper wall 1c of this plane and the plane of the partition portions 8a and 8b, on the left of the fluid tank. Beyond the plane of the portion 8c of the partition, the neck is interrupted over an additional portion of its circumference, on the right of the plane 8a, 8b, up to where it joins the neck 11. Over the remainder of its circumferential length, which substantially corresponds to the upper half of the total circumference, the neck 12 is extended as far as the rear side wall of the fluid tank, which closes the end of the neck.

Beginning at its free end, the neck 11 continues over its entire circumference as far as the plane of the portion 8c of the partition. Beyond that, only the upper half of this neck is extended as far as the rear side wall of the fluid tank, to which it is joined in a sealed manner. In this region, the neck 11 is substantially tangent to the portion 8b of the partition.

The rapid action coupling system shown includes a coupling device 15, which at its end turned toward the fluid tank has an inner neck 16 and an outer neck 17, which are dimensioned and disposed such that they are wedged, respectively, inside the inner neck 11 and over the outside of the outer neck 12 of the fluid tank. A gasket 18 is disposed between the necks 12 and 17. The neck 16 is extended cylindrically over the entire length of the device 15, as far as an open end 19 intended to receive a flexible hose. Outside of the fluid tank, the neck 17 communicates with a neck 20 having an oblique axis and having the same diameter as the neck 16, for coupling to a different flexible hose.

In the upper portion of its perimeter and over part of its length beginning at the end turned toward the fluid tank, the neck 16 is intersected by a third neck 21 of smaller diameter, which is also part of the coupling device 15 which is cast en bloc. The neck 21 extends past the end of the neck 16 to the inside of the fluid tank, where its end is plugged with a non-detachably affixed stopper 22. Outside the fluid tank, the neck 21 is bent at a right angle in a plane parallel to the plane of the axes of the neck 16 and 20, or in other words in a horizontal plane, and is open at its free end 23 so it can be coupled to a flexible hose. The neck 21 is intended for coupling a degassing circuit to the expansion vessel 5. It fits in a recess provided for this purpose in the inner neck 11 of the fluid tank and in the vicinity of the stopper 22 it has a lateral opening 24, by way of which it communicates with a vertical hole 25, made in the piece that forms both the fluid tank and the expansion vessel, that opens into both the interior of the expansion vessel and the recess of the neck 11.

The coupling device 15 has flexible tabs 30 cooperating with ribs 31 of the piece forming both the fluid tank and the expansion vessel, for the interlocking of the two pieces.

Figure 6:
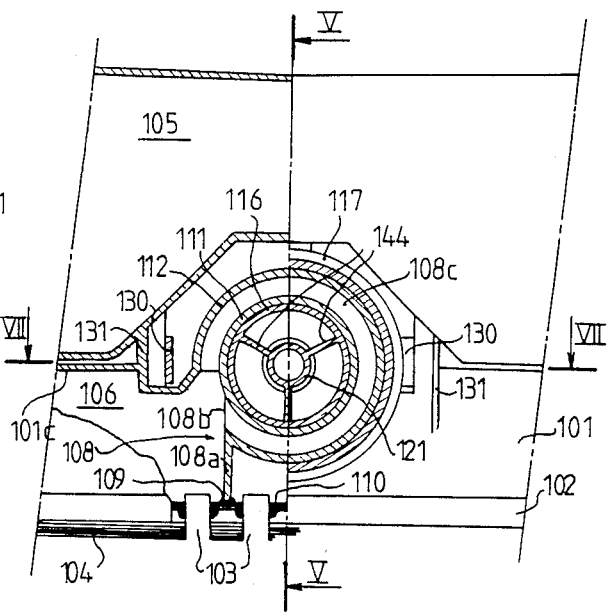
FIG. 6 is a view similar to FIG. 2, taken along the line VI—VI of FIG. 7.

FIGS. 5 and 6 show a fluid tank 101, a collector 102, a bank of tubes 103, and an expansion vessel 105, which are similar to the corresponding elements of FIGS. 1–3.

The fluid tank 101 is divided on the inside into two chambers 106 and 107 by a partition 108 formed all in one piece with the fluid tank and the shape of which can be seen especially in FIG. 8. The partition 108 has a rectilinear lower free edge 109 extending transversely from the rear side wall 101a to the front side wall 101b of the fluid tank. The edge 109 cooperates in a sealed manner with the collector 102, under the same conditions as those under which the edge 9 of the partition 8 cooperates with the collector 2. A plane portion 108a of the partition 108 extends perpendicular to the plane of the collector 102, over the entire width of the fluid tank and over part of its height. This portion 108a is followed by another portion 108b, located in the same plane and extending over part of the width of the fluid tank from its rear wall 101a as far as the upper wall 101c of the fluid tank, formed at that level by the upper portion of a neck 112 embodied integrally with the fluid tank and oriented horizontally and transversely to the longitudinal direction of the fluid tank. The neck 112 is open at its front end 112a.

Another neck 111, of entirely cylindrical shape, is formed integrally with the fluid tank. This neck is housed on the inside of the neck 112 and coaxially with it. It is likewise open at its end 11a turned frontward and is substantially tangent to the portion 108b of the partition.

The partition 108 includes a portion 108c extending in a longitudinal plane that is vertical and perpendicular to the plane of the portions 108a and 108b. This portion 108c is joined to the portion 108b, the neck 112, and the neck 111 by the rear end thereof. Toward the rear, on the right of the plane of the portions 108a and 108b, it defines the annular space included between the necks 111 and 112, which communicates with the chamber 106, while the chamber 107 is extended rearward from the portion 108c and communicates with the interior space of the neck 111.

Figure 7:
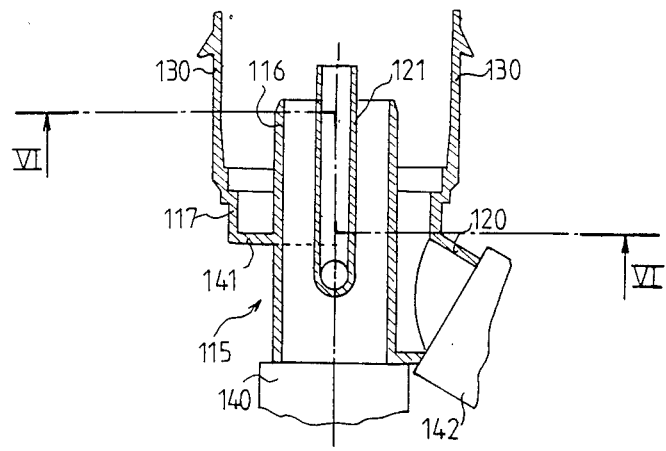
FIG. 7 is a sectional view of the single coupling device, taken along the line VII—VII of FIG. 6.

The coupling system of FIGS. 5–7 includes a coupling device 115 cast en bloc, shown separately in FIG. 7, intended for cooperation with the necks 111 and 112 to connect the chambers 106 and 107 to an external fluid circuit. On the side turned toward the fluid tank, the device 115 has two coaxial necks 116 and 117 open at their end, which are respectively wedged into the interior of the neck 111 and fitted over the outside of the neck 112, with the neck 116 extending beyond the end of the neck 117. The neck 116 has a substantially cylindrical shape over the entire length of the coupling device and at its rear end receives a flexible hose 140, affixed by means not shown, for coupling to the external circuit. Over the majority of its circumference, the annular space defined by the necks 116 and 117 is defined toward the rear by a wall portion 141, and over the remainder of its circumference it communicates with a cylindrical neck 120, the axis of which is oblique with respect to that of the necks 116 and 117, and which receives a flexible hose 142. A third neck 121, coaxial with and inside the necks 116 and 117, is also open at its rear end, projecting past the end of the neck 116. On the front, the neck 121 forms a 90° elbow, passes through the neck 116, and ends on the outside of the neck 116 and in front of the wall 141, where it receives a flexible hose 143. In its portion that is coaxial with the neck 116, the neck 121 is held by radial fins 144 that join it to the neck 116. A piece in the form of an elbow 122, glued or soldered to the fluid tank, tops the open rear end of the neck 121 and assures the communication between the interior of the neck and the expansion vessel 105 via a hole 125 similar to the hole 25 of the system shown in FIGS. 1–4. The neck 121 serves to connect a degassing circuit, of which the flexible hose 143 is a part, to the expansion vessel 105.

A gasket 118, flexible tongues 130 and ribs 131 play the same roles as the respective corresponding elements 18, 30 and 31 in FIGS. 1-4.

Provision may also be made for disposing gaskets between the necks 111 and 116, and between the neck 121 and the element 122.

In FIGS. 9-11, a fluid tank 201 is schematically shown which is similar in its external shape to the fluid tank 101 described above, made integrally with an expansion vessel 205 similar to the vessel 105. The fluid tank 201 is associated with a collector 202 and a bank of tubes 203 provided with fins 204. Contrarily to the embodiments described above, however, the bank of tubes is formed in two rows of tubes, which are juxtaposed within the width of the fluid tank. The number of rows may also be greater than two.

The interior of the fluid tank is divided into two chambers 206 and 207 by a partition 208, the lower edge 209 of which cooperates in a sealed manner with the collector 202. As seen in FIG. 11, the cross section of the partition 208 in a horizontal plane is in the shape of an S; the partition being made up of three planar vertical portions perpendicular to one another, each extending from the edge 209 to the upper wall of the fluid tank, to which they are joined. One portion 208c is oriented in the longitudinal direction of the fluid tank and passes between the two rows of tubes 203. A second portion 208d, perpendicular to the portion 208c, joins one of the longitudinal ends thereof to the rear wall 201a of the fluid tank. Finally, the third portion 208e, parallel to the portion 208d, extends between the opposite end of the portion 208c and the front wall 201b of the fluid tank. The portion 208c of the partition has a circular opening 208f, to the edge of which a cylindrical neck 211 is joined that extends frontward from the portion 208c and is open at its front end. A neck 212 which is coaxial to and external of the neck 211 and is also open at its front end is joined in its lower portion with the front wall 201b of the fluid tank and in its upper portion forms a raised part of the upper wall of the fluid tank which extends as far as the rear wall 201a to which it is joined. The interior of the neck 212 communicates with the chamber 206, which extends past the portion 208d of the partition and to the front of the portion 208c, while the interior of the neck 211 communicates with the chamber 207, which extends past the portion 208e and to the rear of the portion 208c. A vertical hole 225, similar to the holes 25 and 125 described above, discharges in its upper portion into the expansion vessel 205 and communicates in its lower portion with a neck 250 that is coaxial with the necks 211 and 212 and has a smaller diameter than they do. The neck 250 extends from the rear wall 201a of the fluid tank and is open at its front end on the interior of the fluid tank.

The coupling device 215 shown in FIG. 11 is substantially identical to the coupling device 115 of FIG. 7. The necks 216 and 217 and a neck 221 similar to the neck 121 cooperate with the necks 211, 212 and 250, respectively, of the fluid tank to couple the chambers 207 and 206 to an external circuit and to couple the expansion vessel 205 to a degassing circuit.

Because of the portion 208c of the partition that is oriented longitudinally and adjacent to the collector, the rapid action coupling system of FIGS. 9-11 cannot be used when there is only a single row of tubes; it requires at least two rows of tubes. On the other hand, the systems shown in FIGS. 1-8 can be used either with a single row of tubes or with at least two rows of tubes. Otherwise, the various versions of the system have the same characteristics in terms of the facility and rapidity of coupling.

What is claimed is:

1. In a rapid action coupling system for simultaneously coupling a fluid inlet chamber and a fluid outlet chamber to an extended circuit; a heat exchanger fluid tank with a fluid inlet chamber and a fluid outlet chamber (6,7) formed therein and separated from one another by a partition (8), a collector (2) along said fluid tank, said partition having one free edge (9) cooperating in a sealed manner with the collector (2) to define the two chambers, two necks on said fluid tank, one inner neck (11) and one outer neck (12) substantially surrounding the inner neck, the necks defining two fluid passages, respectively an inner and an outer passage, which communicate respectively with the two chambers, said partition including a planar portion (8c) extending in the longitudinal direction of the fluid tank, the inner neck being joined directly to the planar portion, and a coupling device (15), cast en bloc and provided with two necks (16, 17) arranged to cooperate with the inner and outer necks of the fluid tank, respectively; said longitudinal planar portion of the partition being joined to at least one transverse portion of the partition which divides the fluid tank longitudinally.

2. A system as defined by claim 1, wherein the fluid tank and the coupling device have means (30, 31) for interlocking them in a coupled position.

3. A system as defined in claim 2, wherein said fluid tank includes a front wall and a rear wall, said outer neck being joined directly to the front wall of the fluid tank.

4. A system as defined in claim 3 wherein said at least one transverse portion (8a, 8b) of the partition is planar and includes said free edge (9), said at least one transverse portion, over the entire width of the fluid tank, extending between said free edge and the outer neck, and over a fraction of this width, extending from a wall of the fluid tank to the longitudinal portion (8c) of the partition, beyond the outer neck.

5. A system as defined by claim 4, wherein said transverse portion (8a, 8b) of the partition extends upward from the free edge (9) to the inner neck (11), said outer passage only partly surrounding the inner neck.

6. A system as defined by claim 5 wherein said transverse portion of the partition is substantially tangent to the inner neck.

7. A system as defined by claim 4, wherein said transverse portion (108a, 108b) of the partition extends upward from the free edge (109) to the outer wall of the fluid tank, said outer passage entirely surrounding the inner neck (111).

8. A system as defined by claim 7, wherein said transverse portion of the partition is substantially tangent to the inner neck.

9. A system as defined by claim 4 wherein said coupling device includes a degassing neck (21) directed toward the fluid tank (1) and protruding past the ends of the inner and outer necks (11, 12).

10. A system as defined by claim 9, wherein said fluid tank includes an expansion vessel separate from the two chambers of the fluid tank, and connecting conduit (25) communicating said expansion vessel and said degassing neck in said fluid tank.

11. A system as defined by claim 4 wherein said transverse portion of the partition is substantially tangent to said inner neck.

12. A system as defined by claims 3, wherein said partition includes two transverse portions (208d, 208e) respectively connecting two longitudinal ends of said longitudinal portion (208c) to said walls (201a, 201b) of the fluid tank (201).

13. A system as defined by claim 1 wherein said fluid tank includes a front wall and a rear wall, said outer neck being joined directly to the front wall of the fluid tank.

14. A system as defined by claim 13 wherein said at least one transverse portion (8a, 8b) of the partition is planar and includes said free edge (9), said at least one transverse portion, over the entire width of the fluid tank, extending between said free edge and the outer neck, and over a fraction of this width, extending from a wall of the fluid tank to the longitudinal portion (8c) of the partition, beyond the outer neck.

15. A system as defined by claim 1 wherein said fluid tank (201) includes opposed walls, said partition including two transverse portions (208d, 208e) respectively connecting two longitudinal ends of said longitudinal portion (208c) to said walls (201a, 201b) of the fluid tank (201).

16. A system as defined by claim 1 wherein said coupling device includes a degassing neck (21) directed toward the fluid tank (1) and protruding past the ends of the inner and outer necks (11, 12).

17. A system as defined by claim 16 wherein said fluid tank includes an expansion vessel separate from the two chambers of the fluid tank, and a connecting conduit (25) communicating said expansion vessel and said degassing neck in said fluid tank.

* * * * *

UNITED STATES PATENT AND TRADEMARK OFFICE
CERTIFICATE OF CORRECTION

PATENT NO. : 4,977,954

DATED : December 18, 1990

INVENTOR(S) : Michel Potier et al

It is certified that error appears in the above-identified patent and that said Letters Patent is hereby corrected as shown below:

Column 3, line 6, "this plane" should be --the fluid tank--;
         line 7, "the fluid tank" should be --this plane--.

Signed and Sealed this

Nineteenth Day of May, 1992

Attest:

DOUGLAS B. COMER

*Attesting Officer*      Acting Commissioner of Patents and Trademarks